(12) United States Patent
Cho et al.

(10) Patent No.: US 9,128,957 B2
(45) Date of Patent: Sep. 8, 2015

(54) APPARATUS AND METHOD OF FILTERING GEOGRAPHICAL DATA

(75) Inventors: Myoung Su Cho, Seoul (KR); Jin Wook Seo, Seoul (KR); Yeong Gil Shin, Seoul (KR); Won Kyu Lee, Goyang-si (KR); Dong Kyun Jeong, Seongnam-si (KR); Ho Kyung Kim, Seongnam-si (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 672 days.

(21) Appl. No.: 12/767,025

(22) Filed: Apr. 26, 2010

(65) Prior Publication Data

US 2011/0063319 A1 Mar. 17, 2011

(30) Foreign Application Priority Data

Sep. 15, 2009 (KR) .................. 10-2009-0086873

(51) Int. Cl.
| | |
|---|---|
| *G06F 17/30* | (2006.01) |
| *G01C 21/32* | (2006.01) |
| *G01C 21/36* | (2006.01) |
| *G09B 29/10* | (2006.01) |

(52) U.S. Cl.
CPC .......... *G06F 17/30241* (2013.01); *G01C 21/32* (2013.01); *G01C 21/3611* (2013.01); *G09B 29/10* (2013.01); *G01C 21/3679* (2013.01); *G06F 17/3087* (2013.01)

(58) Field of Classification Search
CPC ............... G01C 21/32; G01C 21/3611; G01C 21/3679; G09B 29/10; G06F 17/3087; G06F 17/30241

USPC ................... 345/619; 701/532–533; 707/724
See application file for complete search history.

(56) References Cited

U.S. PATENT DOCUMENTS

| | | | | |
|---|---|---|---|---|
| 2004/0220906 | A1* | 11/2004 | Gargi et al. ................... | 707/3 |
| 2006/0101005 | A1* | 5/2006 | Yang et al. ................... | 707/3 |
| 2010/0094548 | A1* | 4/2010 | Tadman et al. .............. | 701/209 |

FOREIGN PATENT DOCUMENTS

| | | |
|---|---|---|
| JP | 2008-224344 | 9/2008 |
| JP | 2008-226101 | 9/2008 |
| JP | 2008-304324 | 12/2008 |
| KR | 10-2001-0081397 | 8/2001 |
| KR | 10-2005-0000225 | 1/2005 |
| KR | 10-2008-0082513 | 9/2008 |
| KR | 10-2009-0055928 | 6/2009 |

OTHER PUBLICATIONS

Myoungsu Cho et al, "Dynamic Query Interface for Spatial Proximity Query with Degree-of-Interest Varied by Distance to Query Point." *Proceedings of the SIGCHI Conference on Human Factors in Computing Systems. ACM (CHI 2010)*, Apr. 10-15, 2010, pp. 693-702.

* cited by examiner

*Primary Examiner* — Xiao Wu
*Assistant Examiner* — Matthew D Salvucci
(74) *Attorney, Agent, or Firm* — NSIP Law

(57) ABSTRACT

Provided are a method and apparatus of filtering geographical data. The method may include selecting a map region to be retrieved, receiving a retrieval object and a retrieval condition, outputting a trapezoidal interface, verifying a threshold corresponding to a height of the trapezoidal interface for each position of the map region, filtering the retrieval object satisfying the threshold or more or less in each position of the map region to extract the filtered object, and displaying the filtered object on the map region to output the displayed object.

16 Claims, 8 Drawing Sheets

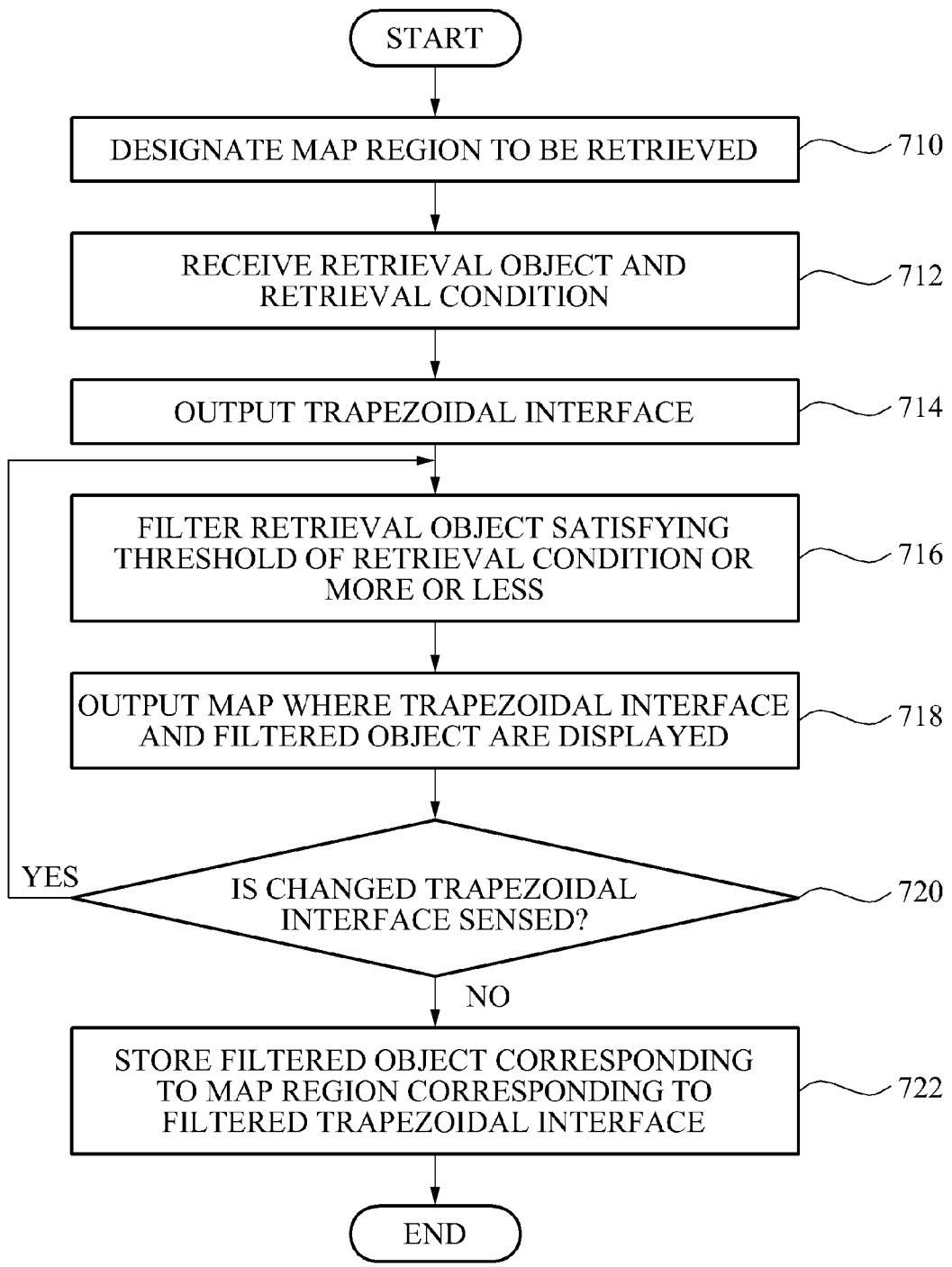

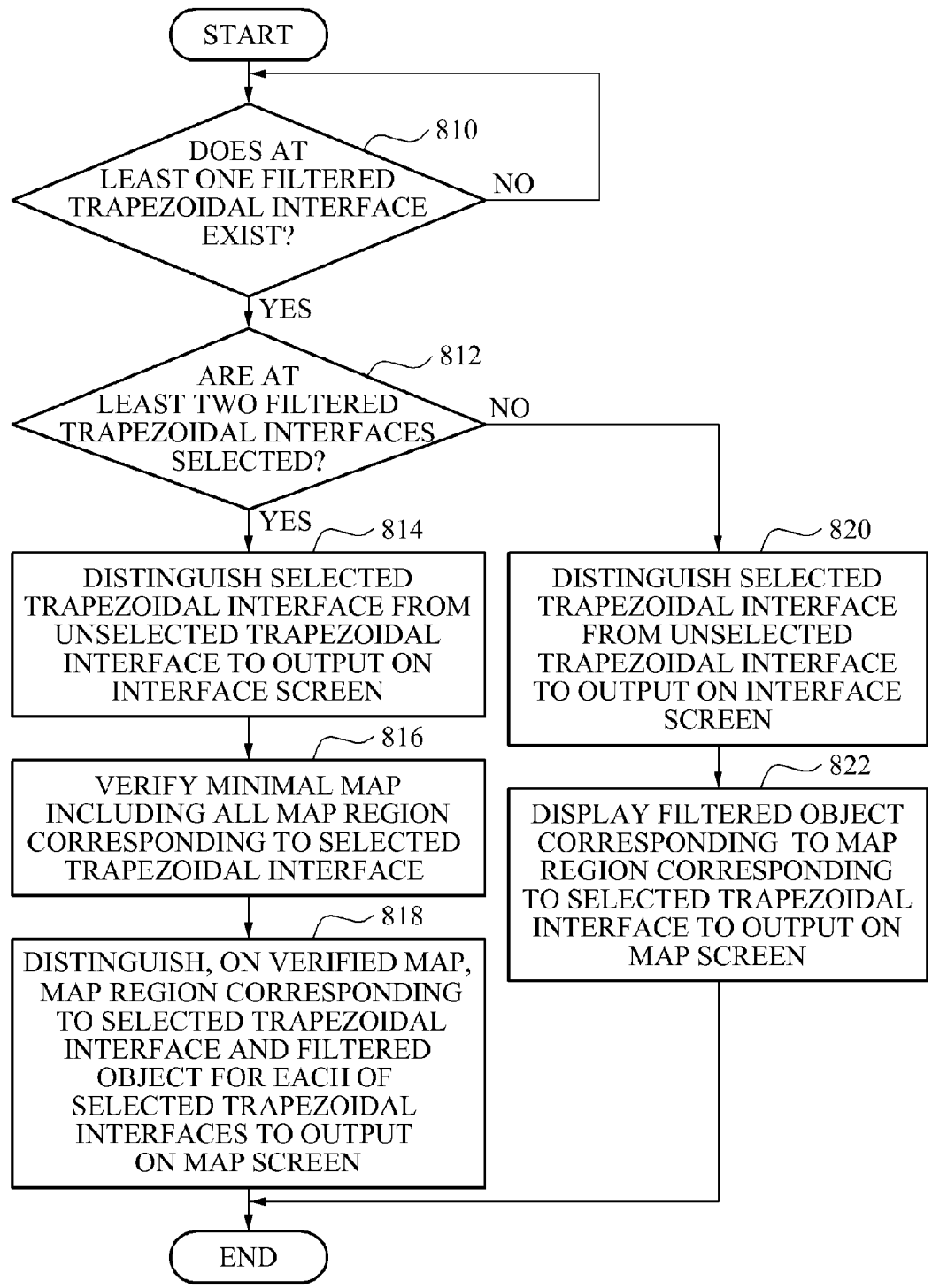

APPARATUS AND METHOD OF FILTERING GEOGRAPHICAL DATA

CROSS-REFERENCE TO RELATED APPLICATION(S)

This application claims the benefit under 35 U.S.C. §119(a) of Korean Patent Application No. 10-2009-0086873, filed on Sep. 15, 2009, in the Korean Intellectual Property Office, the entire disclosure of which is incorporated herein by reference for all purposes.

BACKGROUND

1. Field

The following description relates to an apparatus and method of filtering geographical data including a user interface that may adjust a threshold of a retrieval condition when filtering a retrieval object based on the threshold of the retrieval condition.

2. Description of Related Art

Recently, handheld terminals such as a mobile communication terminal or a Personal Digital Assistant (PDA) have been increasingly used. A utilization range of these handheld terminals has been gradually increased. That is, using the handheld terminal, it may be possible to photograph images using a digital camera mounted in the handheld terminal, to view satellite broadcasting services, to edit documents, to enjoy games, to provide geographic information services, and the like, as well as to make phone calls, to manage scheduling, and the like.

In particular, the geographic information services may be widely utilized due to mobility of the handheld terminal. However, a geographic information-related interface technology established based on a screen of a desktop computer may be difficult to be applicable in a relatively small sized-screen. When the geographic information-related interface technology used in the desktop computer is applicable in the handheld terminal, geographic information may be densely visualized through a map of the relatively small screen, and thus data may be overlapped to each other, and the map may be covered by the data.

SUMMARY

According to an aspect, there may be provided a method of filtering geographical data, including: selecting a map region to be retrieved; receiving a retrieval object and a retrieval condition; outputting a trapezoidal interface; verifying a threshold corresponding to a height of the trapezoidal interface for each position of the map region; filtering the retrieval object satisfying the threshold or more or less in each position of the map region to extract the filtered object; and displaying the filtered object on the map region to output the displayed object.

In this instance, the trapezoidal interface may include a lower side corresponding to a width of the map region, a left side, a right side, and an upper side, each of the left side, the right side. Here, the upper side may indicate a height with respect to the lower side as a threshold of the retrieval condition.

Also, the method may further include: outputting a changed trapezoidal interface when sensing the changed trapezoidal interface; verifying, for each position of the map region, a changed threshold corresponding to a height of the changed trapezoidal interface; filtering the retrieval object satisfying the changed threshold or more or less in each position of the map region to extract a changed filtered object; and displaying the changed filtered object on the map region to output the displayed changed object.

Also, the changed trapezoidal interface may be obtained by adjusting one of a left side, a right side, and an upper side of the trapezoidal interface, by vertically/laterally adjusting both vertices of the upper side of the trapezoidal interface, or by laterally adjusting both vertices of a lower side of the trapezoidal interface.

Also, the method may further include: storing the trapezoidal interface as a filtered trapezoidal interface obtained after the filtering of the retrieval object, and storing the filtered object and the map region, the filtered object corresponding to the filtered trapezoidal interface.

Also, when a filtered trapezoidal interface is selected from a plurality of stored filtered trapezoidal interfaces, the method may further include: distinguishing the selected filtered trapezoidal interface from unselected filtered trapezoidal interfaces to output the distinguished trapezoidal interface on an interface screen; and displaying, on the map region corresponding to the selected filtered trapezoidal interface, the filtered object corresponding to the selected filtered trapezoidal interface to output the displayed filtered object on a map screen.

Also, when at least two filtered trapezoidal interfaces are selected from a plurality of stored filtered trapezoidal interfaces, the method may further include: distinguishing the selected trapezoidal interfaces from unselected filtered trapezoidal interfaces to output the distinguished trapezoidal interface on an interface screen; verifying a minimal map including all map regions corresponding to the selected filtered trapezoidal interfaces; and distinguishing, on the verified minimal map, map regions and filtered objects, for each of the selected filtered trapezoidal interfaces to output the distinguished trapezoidal interface on a map screen. Here, the map regions and the filtered objects may correspond to the selected filtered trapezoidal interfaces.

According to another aspect, there may be provided an apparatus of filtering geographical data, including: an interface processing unit to select a map region to be retrieved, to receive a retrieval object and a retrieval condition, and to output a trapezoidal interface; a filtering unit to verify, for each position of the map region, a threshold corresponding to a height of the trapezoidal interface, and to filter the retrieval object satisfying the threshold or more or less in each position of the map region to output the filtered object; and a screen configuration unit to display the filtered object on the map region to output the displayed object.

In this instance, the screen configuration unit may divide an output screen into an interface screen and a map screen, outputs the trapezoidal interface on the interface screen, and outputs, on the map screen, the map region where the filtered object is displayed.

Also, the trapezoidal interface may include a lower side corresponding to a width of the map region, a left side, a right side, and an upper side, each of the left side, the right side, and the upper side being indicating a height with respect to the lower side as a threshold of the retrieval condition.

Also, the interface processing unit may sense a changed trapezoidal interface, and output the changed trapezoidal interface, the filtering unit may verify a changed threshold corresponding to a height of the changed trapezoidal interface for each position of the map region, and filter the retrieval object satisfying the changed threshold or more or less in each position of the map region to extract a changed filtered object, and the screen configuration unit may display the changed filtered object on the map region and outputs the displayed changed filtered object.

Also, the interface processing unit may sense the changed trapezoidal interface by adjusting one of a left side, a right side, and an upper side of the trapezoidal interface, by vertically/laterally adjusting both vertices of the upper side of the trapezoidal interface, or by laterally adjusting both vertices of a lower side of the trapezoidal interface.

Also, the filtering unit may store the trapezoidal interface as a filtered trapezoidal interface obtained after the filtering of the retrieval object, and store the filtered object corresponding to the filtered trapezoidal interface and the map region.

Also, when a filtered trapezoidal interface is selected from a plurality of stored filtered trapezoidal interfaces in the interface processing unit, the screen configuration unit may distinguish the selected filtered trapezoidal interface from unselected filtered trapezoidal interfaces to output the distinguished trapezoidal interface on an interface screen, and display, on the map region corresponding to the selected filtered trapezoidal interface, the filtered object corresponding to the selected filtered trapezoidal interface to output the displayed filtered object on a map screen.

Also, when at least two filtered trapezoidal interfaces are selected from a plurality of stored filtered trapezoidal interfaces in the interface processing unit, the screen configuration unit may distinguish the selected trapezoidal interfaces from unselected filtered trapezoidal interfaces to output the distinguished trapezoidal interface on an interface screen, verify a minimal map including all map regions corresponding to the selected filtered trapezoidal interfaces, and distinguish, on the verified minimal map, map regions and filtered objects for each of the selected filtered trapezoidal interfaces to output the distinguished trapezoidal interface on a map screen. Here, the map regions and the filtered objects may correspond to the selected filtered trapezoidal interface.

Other features and aspects will be apparent from the following detailed description, the drawings, and the claims.

BRIEF DESCRIPTION OF THE DRAWINGS

FIG. 7 is a flowchart illustrating a process of filtering geographical information according to an embodiment.

FIG. 8 is a flowchart illustrating a process of outputting a filtering result in a case where a plurality of filtering results including a trapezoidal interface exists according to an embodiment.

Figure 1:
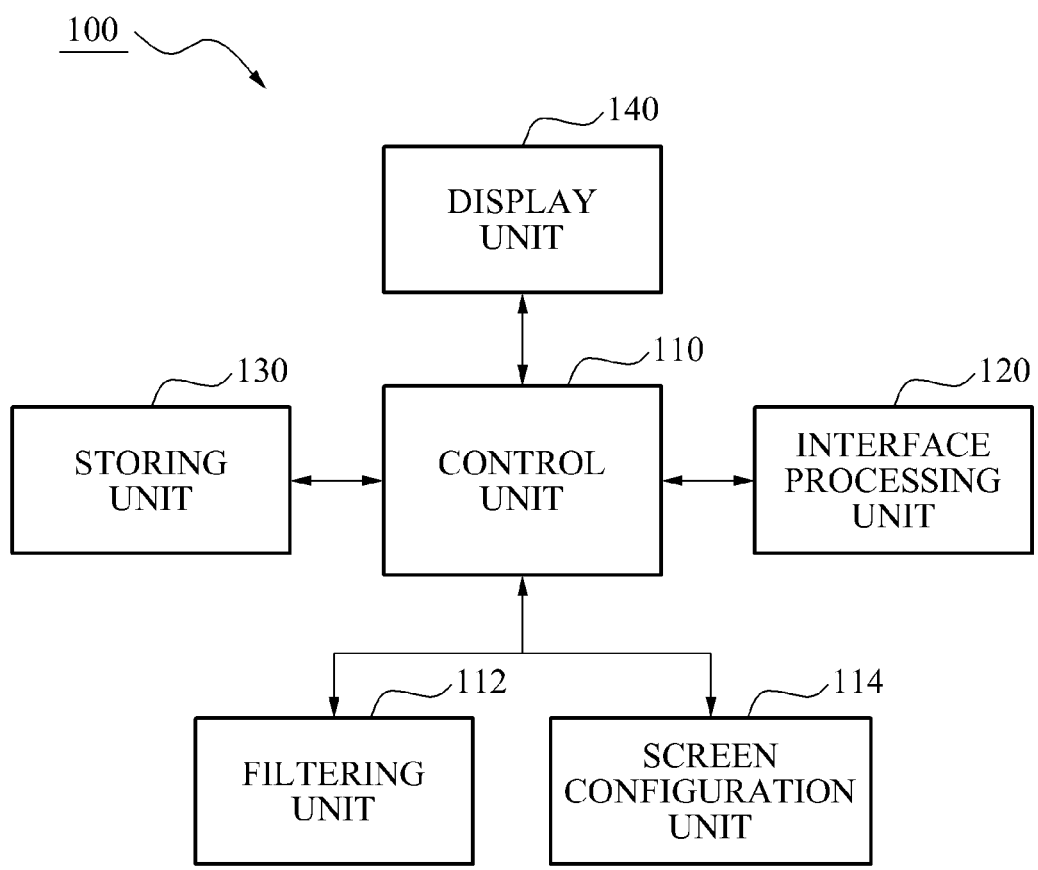
FIG. 1 is a diagram illustrating a configuration of an apparatus of filtering geographical data according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Embodiments relate to an apparatus and method of filtering geographical information including a trapezoidal interface capable of adjusting a threshold of a retrieval condition to be filtered when filtering a retrieval object based on the threshold of the retrieval condition.

FIG. 1 is a diagram illustrating a configuration of an apparatus of filtering geographical data according to an embodiment. Referring to FIG. 1, an apparatus 100 includes a control unit 110, a filtering unit 112, a screen configuration unit 114, an interface processing unit 120, a storing unit 130, and a display unit 140.

The storing unit 130 may store geographical information, and may store a filtering result including an object to be filtered corresponding to a map region corresponding to a filtered trapezoidal interface.

The display unit 130 may display an output screen including an interface screen and a map screen which are configured in the screen configuration unit 114.

The interface processing unit 120 may select a map region to be retrieved, and may receive, from a user, a retrieval object and a retrieval condition in the map region. The retrieval condition may be a quantified condition used for filtering the retrieval object. For example, when the retrieval object is a recommendable restaurant, examples of the retrieval condition may be costs, rating, recognition, atmosphere, and the like with respect to the recommendable restaurant.

The interface processing unit 120 may transmit, to the filtering unit 112 and the screen configuration unit 114, a predetermined trapezoidal interface or a most currently designated trapezoidal interface. The interface processing unit 120 may sense a changed trapezoidal interface by an input of a user, and transmit, to the filtering unit 112 and the screen configuration unit 114, the changed trapezoidal interface. The interface processing unit 120 may adjust the trapezoidal interface as illustrated in FIGS. 3 and 4.

Figure 3:
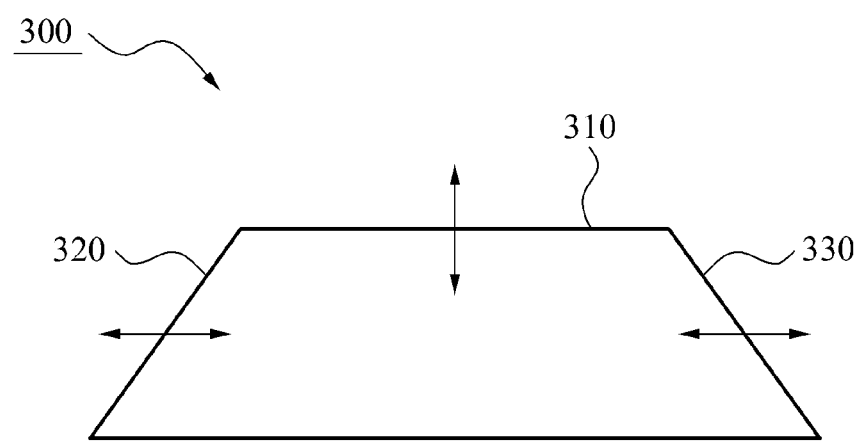
FIG. 3 is a diagram illustrating an example of adjusting a trapezoidal interface according to an embodiment.

FIG. 3 is a diagram illustrating an example of adjusting a trapezoidal interface according to an embodiment. Referring to FIG. 3, a trapezoidal interface 300 includes an upper side 310, a left side 320, and a right side 330, each of which may be adjusted using the interface processing unit 120.

Figure 4:
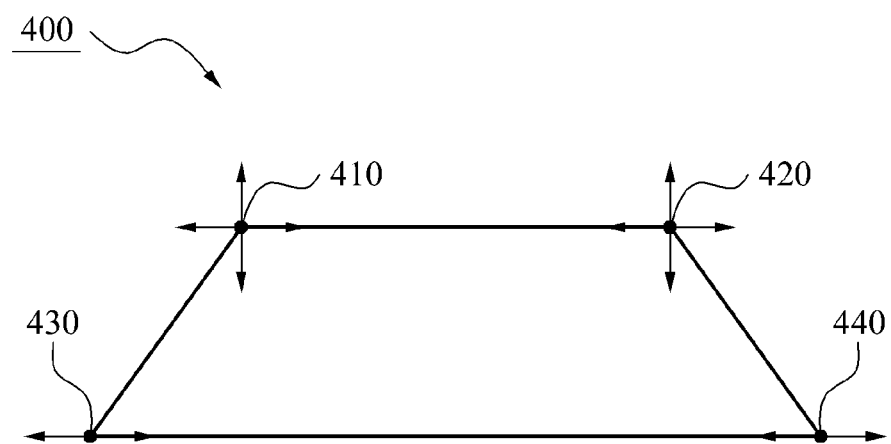
FIG. 4 is a diagram illustrating another example of adjusting a trapezoidal interface according to an embodiment.

FIG. 4 is a diagram illustrating another example of adjusting a trapezoidal interface according to an embodiment. Referring to FIG. 4, vertices of the trapezoidal interface 400 may be adjusted using the interface processing unit 120. In this instance, as illustrated in FIG. 4, two vertices 410, 420 of an upper side of the trapezoidal interface may be vertically/laterally adjusted, and two vertices 430, 440 of a lower side thereof may be laterally adjusted. In addition, when adjusting a first vertex (e.g., vertex 410) of the two vertices 410, 420 of the upper side, the other vertex (e.g., vertex 420) may be accordingly adjusted to have the same height as that of the first vertex, or to have a height different from that of the first vertex. Hereinafter, embodiments in which the vertices of the upper side are adjusted to have the same height will be described.

The filtering unit 112 may filter the retrieval object satisfying a threshold of the retrieval condition or more or less in the map region. In this instance, the threshold of the retrieval condition may correspond to a height of the trapezoidal interface. The filtering unit 112 may display, on the map region, the filtered object, and transmit the displayed filtered object to the screen configuration unit 114. An example in which the retrieval object is filtered in the filtering unit 112 using the trapezoidal interface will be described in detail with reference to FIG. 2.

Figure 2:
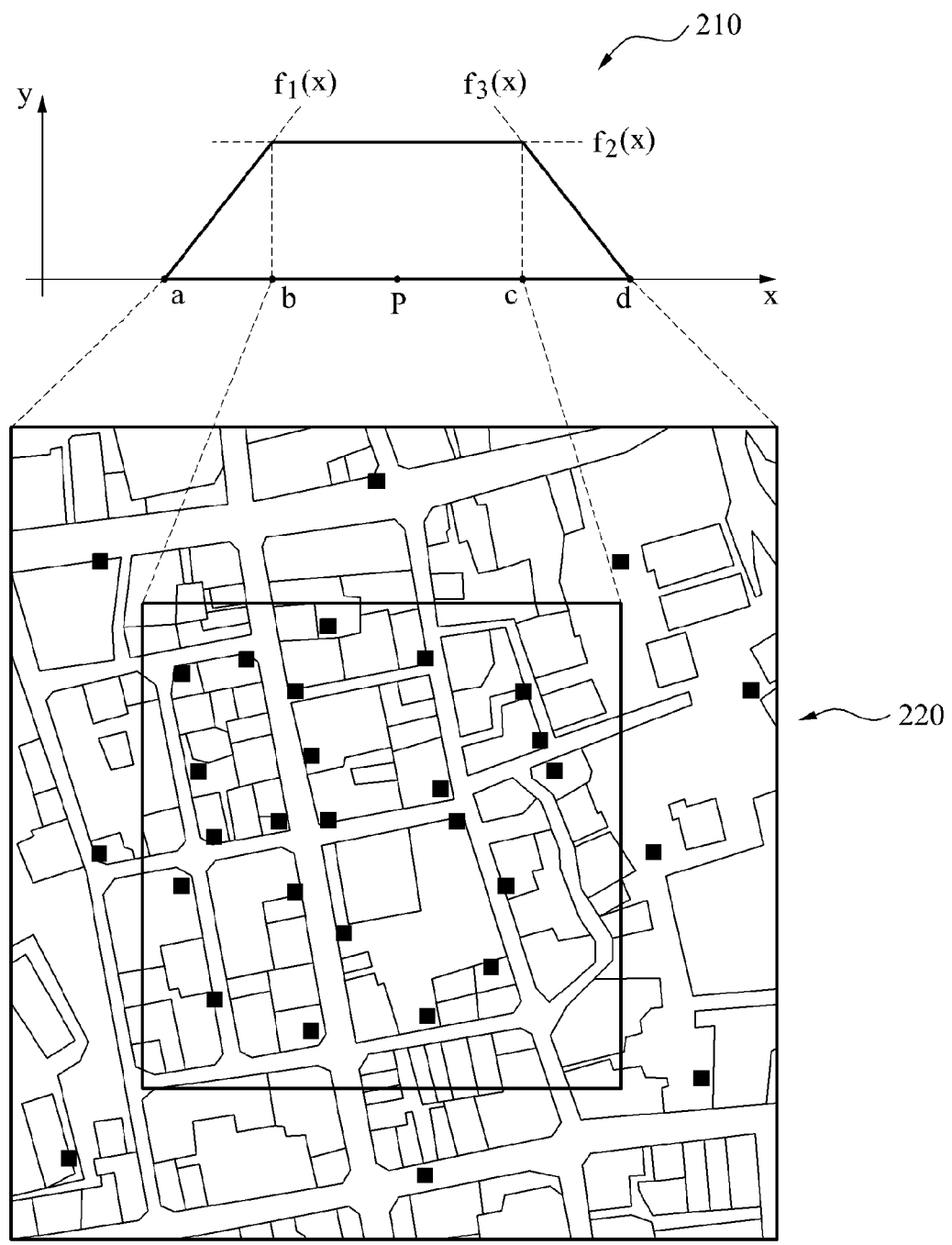
FIG. 2 is a diagram illustrating a map filtered by a trapezoidal interface according to an embodiment.

FIG. 2 is a diagram illustrating a map filtered by a trapezoidal interface 210 according to an embodiment. Referring to FIG. 2, a horizontal axis of the trapezoidal interface 210 may designate a map region intended to be filtered, and a vertical axis (height) of the trapezoidal interface 210 may indicate a threshold of a quantified retrieval condition.

The point "a" of the trapezoidal interface 210 may designate a left side of a map region 220 displayed on a screen, and "d" of the trapezoidal interface 210 may designate a right side of the map region 220. Using a ratio of an area of the map region 220 to a distance from "a" to "d", a position of the map region 220 corresponding to "b" and "c" may be obtained.

Respective sides excluding a lower side of the trapezoidal interface 210 may be designated as f1(x), f2(x), and f3(x), that is, linear equations. In this instance, f1(x), f2(x), and f3(x) may be thresholds used for filtering the map region. Using the trapezoidal interface 210, it may be possible to designate different thresholds with respect to retrieval objects located near a current position (P) of a user and retrieval objects located far away from the current position (P).

A threshold corresponding to the height of the trapezoidal interface 210 may be given as the following Equation 1.

$$f(x) = \begin{cases} f_1(x), & a \le x < b \\ f_2(x), & b \le x \le c \\ f_3(x), & c < x \le d \end{cases}$$ [Equation 1]

By means of the filtering unit 112, a set S of filtered objects obtained by a filtering process, from among n retrieval objects, may be given as the following Equation 2.

$$S = \{I_k | \mathrm{Dist}(I_k) \le p-a, \mathrm{Dist}(I_k) \le d-p, f(x_k) \le \mathrm{Eval}(I_k)\},$$
where $I_k = (x_k, y_k)$ and $1 \le k \le n,$ [Equation 2]

where, $\mathrm{Dist}(I_k)$ denotes a distance from $x_k$ to p, and $\mathrm{Eval}(I_k)$ denotes an evaluation function calculating a quantified value of a k-th retrieval object.

The screen configuration unit 114 may divide an output screen into an interface screen and a map screen, and output, on the interface screen, a trapezoidal interface received from the interface processing unit 120, and output, on the map screen, a map region where a filtered object received from the filtering unit 112 is displayed.

Figure 5:
FIG. 5 is a diagram illustrating a configuration of an output screen obtained when a single trapezoidal interface is selected from a plurality of trapezoidal interfaces according to an embodiment.
Figure 6:
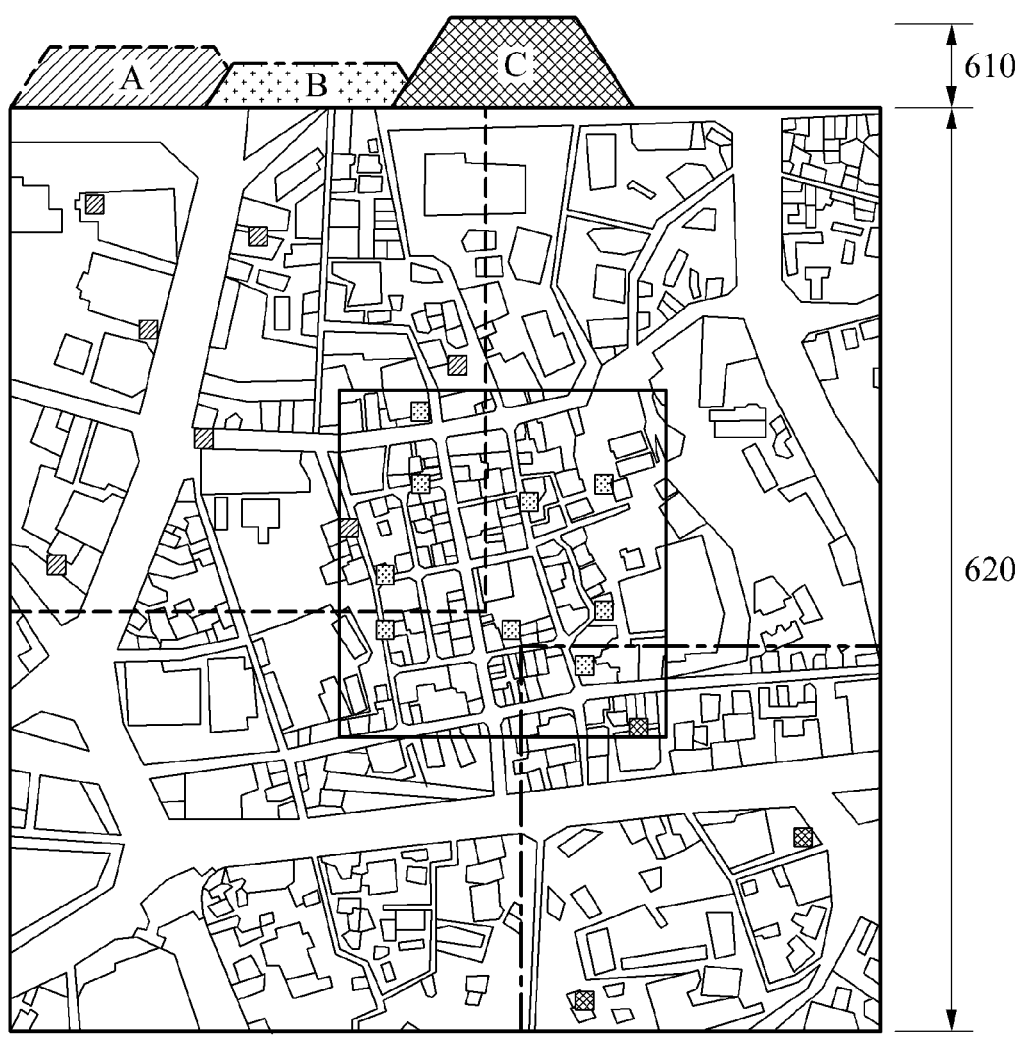
FIG. 6 is a diagram illustrating a configuration of an output screen obtained when several trapezoidal interface are selected from a plurality of trapezoidal interfaces according to an embodiment.

By means of the screen configuration unit 114, when a plurality of filtered results is stored in the storing unit 130, FIGS. 5 and 6 may be obtained depending on a number of the filtered results being selected.

FIG. 5 is a diagram illustrating a configuration of an output screen obtained when a single trapezoidal interface is selected from a plurality of trapezoidal interfaces according to an embodiment. FIG. 5 illustrates an output screen obtained when a single filtered result is selected from three filtered results.

Referring to FIG. 5, the screen configuration unit 114 may output three trapezoidal interfaces on an interface screen 510, and distinguish a selected trapezoidal interface of the three trapezoidal interfaces from unselected trapezoidal interfaces. The screen configuration unit 114 may output, on a map screen 520, a map region where a filtered (retrieval) object corresponding to a trapezoidal interface C is displayed.

FIG. 6 is a diagram illustrating a configuration of an output screen obtained when several trapezoidal interface are selected from a plurality of trapezoidal interfaces according to an embodiment. FIG. 6 illustrates an output screen obtained when all filtered results are selected.

Referring to FIG. 6, the screen configuration unit 114 may output three trapezoidal interfaces on an interface screen 610. In this instance, the three trapezoidal interfaces may be displayed to be distinguished from each other.

Next, the screen configuration unit 114 may verify a minimal map including all map regions corresponding to selected trapezoidal interfaces that are intended to outputted on a map region 620.

Next, the screen configuration unit 114 may distinguish, on the verified map, map regions corresponding to the selected trapezoidal interfaces and filtered objects corresponding to the selected trapezoidal interfaces, for each of the trapezoidal interfaces, and output the distinguished map regions on the map screen 620.

The screen configuration unit 114 may distinguish the selected trapezoidal interfaces, the map regions, and the filtered objects from one another, using types, colors, and the like displaying the selected trapezoidal interfaces, the map regions, and the filtered objects.

Hereinafter, a method of filtering geographical information configured as the above will be described with reference to FIG. 7.

FIG. 7 is a flowchart illustrating a process of filtering geographical information according to an embodiment. Referring to FIG. 7, in operation 710, the apparatus of filtering the geographical information according to an embodiment may designate a map region to be retrieved. More specifically, in operation 710, the apparatus may receive a selection of a user with respect to the map region. In operation 712, the apparatus may receive a retrieval object and a retrieval condition in the map region. Here, the retrieval condition may be a quantified condition used for filtering the retrieval object. For example, when the retrieval object is a recommendable restaurant, examples of the retrieval condition may be a cost, a rating, recognition, an atmosphere, and the like with respect to the recommendable restaurant.

In operation 714, the apparatus may output a predetermined trapezoidal interface or a most currently designated trapezoidal interface. In operation 716, the apparatus may verify a threshold corresponding to a height of the trapezoidal interface, for each position of the map region, and filter a retrieval object satisfying a threshold of a corresponding retrieval condition or more or less in each position of the map region. For example, when the retrieval object is a recommendable restaurant, the retrieval condition is a rating, and a threshold of a corresponding trapezoidal interface is "7", the apparatus may filter recommendable restaurants having the rating of "7" or more in the map region.

In operation 718, the apparatus may output a map where the trapezoidal interface and the filtered object are displayed.

In operation 720, the apparatus may verify whether the trapezoidal interface is changed.

When the trapezoidal interface is changed based on the verified result of operation 720, the apparatus may return to operation 716, and may repeatedly perform operations 716 to 720.

When the trapezoidal interface is not changed based on the verified result of operation 720, the apparatus may advance operation 722, and store the trapezoidal interface as a filtered trapezoidal interface obtained after the filtering of the retrieval object, and store the filtered object and the map region. In this instance, the filtered object may correspond to the filtered trapezoidal interface.

FIG. 8 is a flowchart illustrating a process of outputting a filtering result in a case where a plurality of filtering results including a trapezoidal interface exists according to an embodiment.

Referring to FIG. 8, in operation 810, the apparatus of filtering the geographical information may verify whether at least one filtered trapezoidal interface exists. That is, the apparatus may verify whether at least one stored filtered result exists.

In operation 812, when at least one filtered trapezoidal interface exists based on the verified result of operation 810, the apparatus may verify a number of the filtered trapezoidal interfaces selected by a user.

In operation 814, when at least two filtered trapezoidal interfaces are selected based on the verified result of operation 812, the apparatus may distinguish the selected trapezoidal interfaces from unselected trapezoidal interfaces to output the distinguished trapezoidal interfaces on an interface screen. In operation 816, the apparatus may verify a minimal map including all map regions corresponding to the selected trapezoidal interfaces. In operation 818, the apparatus may distinguish, on the verified minimal map, map regions corresponding to the selected trapezoidal interfaces and filtered objects corresponding to the selected trapezoidal interfaces, for each of the trapezoidal interfaces to output the distinguished trapezoidal interface on a map screen.

In operation 820, when one filtered trapezoidal interface is selected based on the verified result of operation 812, the apparatus may distinguish the selected trapezoidal interface from unselected trapezoidal interface to output the distinguished trapezoidal interface on the interface screen. In operation 822, the apparatus may display, on the map region corresponding to the selected trapezoidal interface, the filtered object to output the displayed filtered object on a map screen.

As described above, according to example embodiments, there are provided the apparatus and method of filtering geographical information based on a threshold of a retrieval condition, using a trapezoidal interface enabling to adjusting the threshold, and thereby it may be possible to perform an intuitive filtering operation using the trapezoidal interface.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of filtering geographical data, the method comprising:

selecting a map region to be retrieved;

receiving an identification of a retrieval object and an identification of a retrieval condition;

generating a trapezoidal interface whose height represents a threshold value of the identified retrieval condition;

identifying, within the selected map region, a target object corresponding to the identified retrieval object and the identified retrieval condition and having a parameter corresponding to the identified retrieval condition whose value is equal or greater value than the threshold value;

differentiating, through graphical art, the target object from other objects within a revision of the selected map region; and displaying, with a display device, the revised map region and the trapezoidal interface, wherein the threshold value is a standard value of the retrieval condition to filter the retrieval object and the threshold value is changed depending on the height of the trapezoidal interface, and the revised map region is displayed outside the trapezoidal interface;

detecting a revised threshold value of the identified retrieval condition based on a changed height of the trapezoidal interface;

identifying, within the selected map region, a revised target object corresponding to the identified retrieval object and the identified retrieval condition and having equal or greater value than the revised threshold value;

differentiating, through graphical art, the revised target object from other objects within a subsequent revision of the selected map region; and displaying the subsequent revision of the map region and a modified trapezoidal interface to have the changed height with the display device, wherein the modified trapezoidal interface is modified by adjusting one of a left side, a right side, and an upper side of the trapezoidal interface, by vertically/laterally adjusting both vertices of the upper side of the trapezoidal interface, or by laterally adjusting both vertices of a lower side of the trapezoidal interface.

2. The method of claim 1, wherein the trapezoidal interface comprises a lower side whose width represents a width of the map region and an upper side whose width represents a width of the selected map region.

3. The method of claim 1, further comprising:
storing the trapezoidal interface; and
storing a representation of the displayed map region.

4. The method of claim 3, further comprising, in response to a trapezoidal interface being selected from a plurality of stored trapezoidal interfaces:
distinguishing, through graphical art, the selected trapezoidal interface from unselected trapezoidal interfaces with the display device on an interface screen; and
displaying a map region corresponding to the selected trapezoidal interface, wherein
the corresponding map region differentiates, through graphical art, an object corresponding to an identified retrieval object and an identified retrieval condition, received for the corresponding map region, from other objects within the corresponding map region.

5. The method of claim 3, further comprising, in response to at least two trapezoidal interfaces being selected from a plurality of stored trapezoidal interfaces:
distinguishing, through graphical art, the selected trapezoidal interfaces from unselected trapezoidal interfaces with the display device on an interface screen; and
displaying a compiled map comprising all map regions corresponding to the selected trapezoidal interfaces, wherein
for each displayed map region corresponding to a selected trapezoidal interface, the corresponding map region differentiates, through graphical art, an object corresponding to an identified retrieval object and an identified retrieval condition, received for the corresponding map region, from other objects within the compiled map.

6. A non-transitory computer-readable medium comprising a program for instructing a computer to perform the method of claim 1.

7. The method of claim 1, wherein the revised map region is displayed only when the trapezoidal interface is selected for activation.

8. The method of claim 1, further comprising:
generating, for each of a plurality of received retrieval condition identifications, a trapezoidal interface whose height represents a threshold value of the identified retrieval condition;
identifying, for each trapezoidal interface and within a map region corresponding to the trapezoidal interface, a target object corresponding to the identified retrieval object and the identified retrieval condition and having equal or greater value than the threshold value associated with the trapezoidal interface;
differentiating, through graphical art for each map region, the target object from other objects within a revision of the map region;
displaying the generated trapezoidal interfaces with the display device; and
displaying with the display device, for all trapezoidal interfaces activated by selection of a user, a compilation of the revised map regions associated with the activated trapezoidal interfaces and not displaying revised map regions associated with trapezoidal interfaces that have not been activated by selection of the user.

9. An apparatus configured to filter geographical data, the apparatus comprising:
an interface processing unit configured to:
select a map region to be retrieved;
receive an identification of a retrieval object and an identification of a retrieval condition;
generate a trapezoidal interface whose height represents a threshold value of the identified retrieval condition;
detect a revised threshold value of the identified retrieval condition based on a changed height of the trapezoidal interface; and
modify the trapezoidal interface by adjusting one of a left side, a right side, and an upper side of the trapezoidal interface, by vertically/laterally adjusting both vertices of the upper side of the trapezoidal interface, or by laterally adjusting both vertices of a lower side of the trapezoidal interface;
a filtering unit configured to:
identify, within the selected map region, a target object corresponding to the identified retrieval object and the identified retrieval condition and having a parameter corresponding to the identified retrieval condition whose value is equal or greater value than the threshold value;
differentiate, through graphical art, the target object from other objects within a revision of the selected map region;
identify, within the selected map region, a revised target object corresponding to the identified retrieval object and the identified retrieval condition and having equal or greater value than the revised thr hold value; and
differentiate, through graphical art, the revised target object from other objects within a subsequent revision of the selected map region; and
a screen configuration unit configured to;
display, with a display device, the revised map region and the generated trapezoidal interface; and
display the subsequent revision of the map region and a modified trapezoidal interface to have the changed height with the display device,
wherein:
the threshold value is a standard value of the retrieval condition to filter the retrieval object and the threshold value is changed depending on the height of the trapezoidal interface, and
the revised map region is displayed outside the trapezoidal interface.

10. The apparatus of claim wherein the screen configuration unit is further configured to:
divide an output screen into an interface screen and a map screen;
output the trapezoidal interface on the interface screen; and
output, on the map screen, the revised map region.

11. The apparatus of claim 9, wherein the trapezoidal interface comprises a lower side whose width represents a width of the map region and an upper side whose width represents a width of the selected map region.

12. The apparatus of claim 9, wherein the filtering unit is further configured to:
store the trapezoidal interface; and
store a representation of the displayed map region.

13. The apparatus of claim 12, wherein, in response to a trapezoidal interface being selected from a plurality of stored trapezoidal interfaces in the interface processing unit, the screen configuration unit is further configured to:

distinguish, through graphical art, the selected trapezoidal interface from unselected trapezoidal interfaces with the screen configuration unit on an interface screen; and display a map region corresponding to the selected trapezoidal interface, wherein the corresponding map region differentiates, through graphical art, an object corresponding to an identified retrieval object and an identified retrieval condition, received for the corresponding map region, from other objects within the corresponding map region.

14. The apparatus of claim 12, wherein:

in response to at least two trapezoidal interfaces being selected from a plurality of stored trapezoidal interfaces in the interface processing unit, the screen configuration unit is further configured to:

distinguish, through graphical art, the selected trapezoidal interfaces from unselected trapezoidal interfaces on an interface screen, display a compiled map comprising all map regions corresponding to the selected trapezoidal interfaces, wherein for each displayed map region corresponding to a selected trapezoidal interface, the corresponding map region differentiates, through graphical art, an object corresponding to an identified retrieval object and an identified retrieval condition, received for the corresponding map region, from other objects within the compiled map.

15. The apparatus of claim 9, wherein the revised map region is displayed only when the trapezoidal interface is selected for activation.

16. The apparatus of claim 9, wherein:

for each of a plurality of received retrieval condition identifications, a trapezoidal interface is generated whose height represents a threshold value of the identified retrieval condition;

for each trapezoidal interface and within a map region corresponding to the trapezoidal interface, a target object is identified that corresponds to the identified retrieval object and the identified retrieval condition and having equal or greater value than the threshold value associated with the trapezoidal interface;

for each map region, the target object is differentiated, through graphical art, from other objects within a revision of the map region;

the generated trapezoidal interfaces are displayed by the screen configuration unit; and the screen configuration unit displays, for all trapezoidal interfaces activated by selection of a user, a compilation of the revised map regions associated with the activated trapezoidal interfaces and does not display revised map regions associated with trapezoidal interfaces that have not been activated by selection of the user.

* * * * *